Nov. 25, 1924.

G. W. PELTON

PRESS

Filed Sept. 2, 1919

1,516,982

3 Sheets-Sheet 1

Inventor
G.W. Pelton.

Nov. 25, 1924. 1,516,982
G. W. PELTON
PRESS
Filed Sept. 2, 1919 3 Sheets-Sheet 2

Inventor
G.W. Pelton.

Witness

By
Attorneys

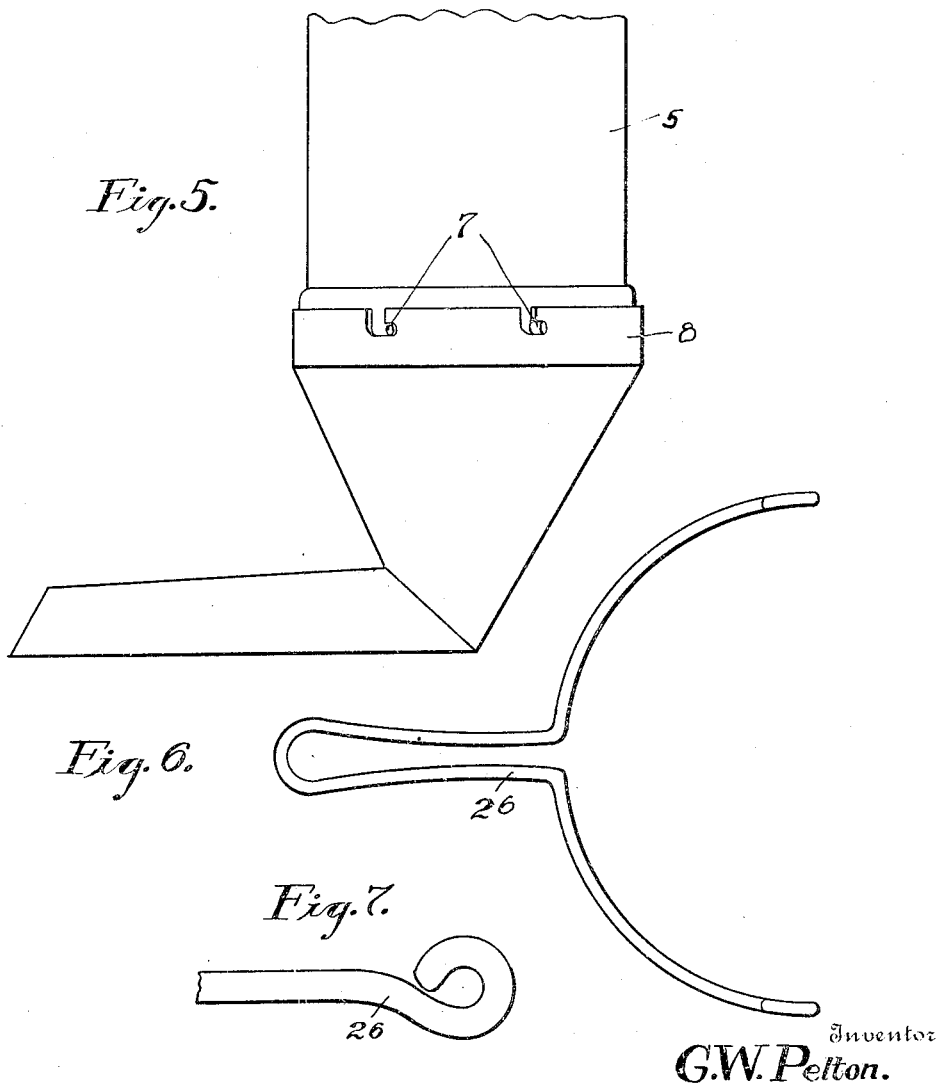

Patented Nov. 25, 1924.

1,516,982

UNITED STATES PATENT OFFICE.

GEORGE W. PELTON, OF MUSCATINE, IOWA.

PRESS.

Application filed September 2, 1919. Serial No. 321,083.

*To all whom it may concern:*

Be it known that I, GEORGE W. PELTON, a citizen of the United States, residing at Muscatine, in the county of Muscatine and State of Iowa, have invented a new and useful Press, of which the following is a specification.

The present invention relates to presses, the principal object being to provide a press that may be adapted to a variety of uses such as extracting fruit juices, pressing lard, meat or cheese and stuffing sausage.

A further object of the invention is to provide a press the construction of which is such as to permit the parts to readily interchange or to adapt the press to the various uses named.

Still another object of the invention resides in the provision of a hand press which includes a threaded stem for moving the follower against the contents of the press, associated with a sectional nut or sleeve of novel construction which may be readily moved out of engagement with the threaded stem to permit the latter to be withdrawn without threading the same through the nut or sleeve.

It is another object of the invention to provide a press which embodies an improved supporting bracket which will permit the press to be readily lifted therefrom;

Another general object of the invention is to provide a press having the above characteristics which is simple in construction, which consists of few parts, and which may be manufactured and sold at minimum cost.

With the above and other objects and advantages in mind, the invention consists of the combinations of elements constructions and arrangements of parts, operation and general assemblage all of which will be hereinafter enlarged upon and set forth in the appended claim, the invention being illustrated in the attached drawings, wherein:—

Figure 1:
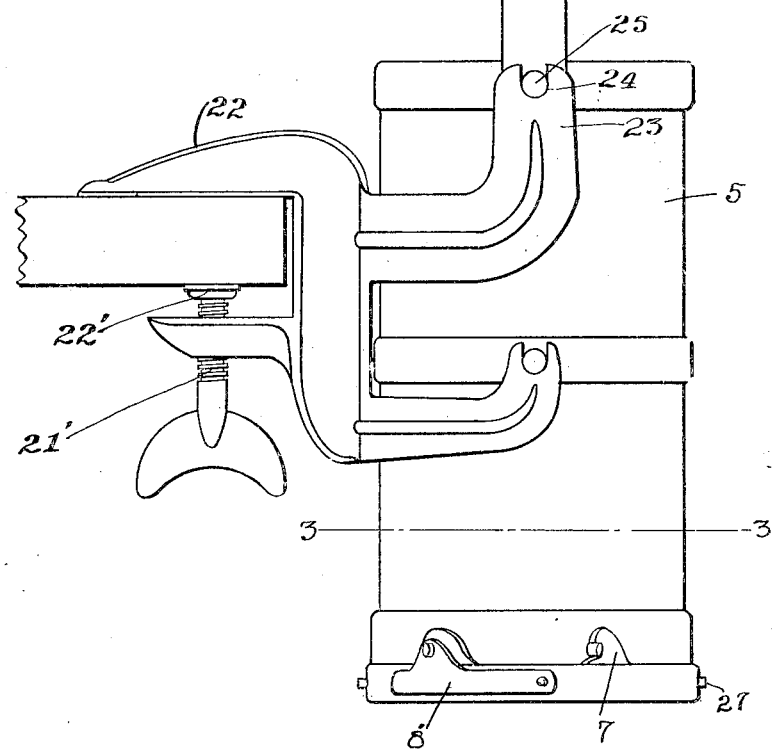
Figure 2:
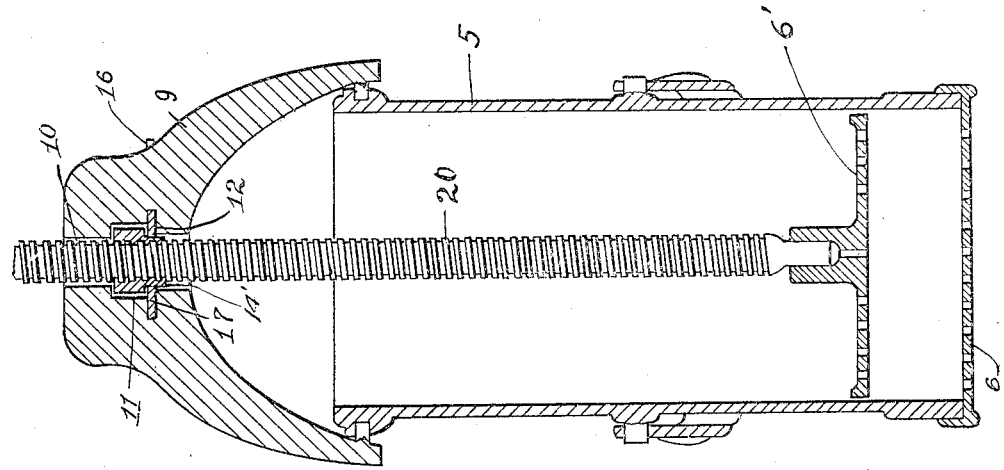
Figure 3:
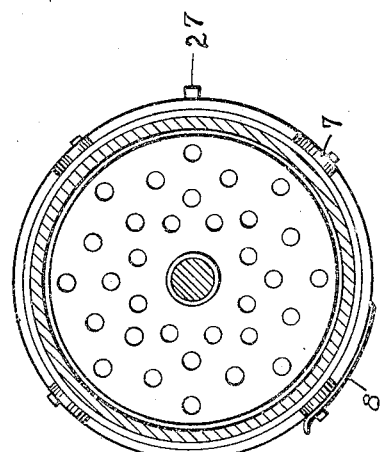
Figure 4:
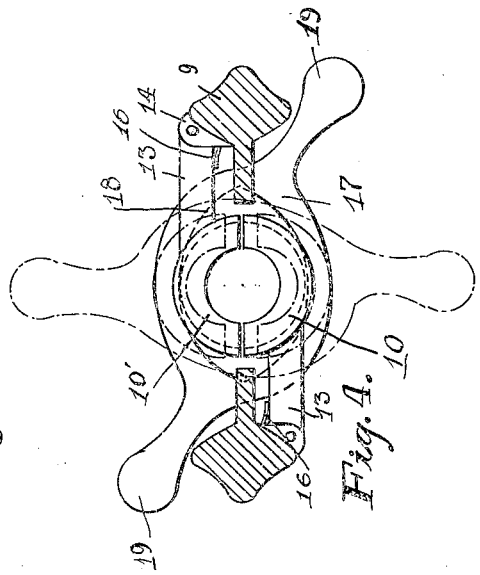

Figure 1. is a side elevation of my improved press in operative position;

Figure 2. is a vertical longitudinal sectional view of the same;

Figure 3. is a transverse sectional view taken on line 3—3 of Figure 1;

Figure 4. is a transverse sectional view taken on line 4—4 of Figure 1, and illustrating the sectional nut, the full line showing indicating the nut in closed position while the dotted line showing illustrates the nut in open position;

Figure 5. is a fragmentary view illustrating a sausage stuffing attachment assembled with the press;

Figures 6 and 7 are detail views of the wrench used in disengaging the perforated plate from the press.

Referring to the drawing wherein like characters of reference denote like parts the numeral 5 designates the hopper or receptacle, the ends of which are open. Associated with the lower end of the hopper during the juice extracting operation is a perforated plate 6 held in place by a bayonet slot and pin connection 7.

An inverted truncated cone-shaped member 8 which terminates in a laterally extending discharge is adapted to be mounted on the hopper in lieu of the plate 6 when stuffing sausage.

A resilient latch 8' is mounted at the lower end of the hopper and is engageable with one of the lugs or pins on the hopper to retain the plate 6 or member 8 in position thereon.

Detachably engaged with the upper end of the hopper and capable of being swung to one side, is a yoke 9, provided with a central bore 10 and further provided with an opening 11 and slot 12 which are in communication with each other and with the bore 10.

Complementary nut sections 10' provided with interior screw threads, are disposed in the opening 11. Each of these nut sections is formed with an outstanding arm 13 which are pivotally mounted in bearings 14 on the yoke 9. Leaf springs 16 are positioned between the bearings and ears to normally urge the nut sections apart.

An eccentric shaped clamping member 17 is disposed in the slot 12 and is formed with an eccentric opening 18 in which the extensions 14' are disposed, which extensions form a part of the nut sections. Operating handles 19 extend from opposite sides of the clamping member by means of which the latter is rotated a half turn to move the nut sections into engagement with the threaded rod 20 disposed in the bore 10.

A plurality of compression plates or followers are provided for the various operations. In Figure 2 the perforated juice extracting follower 6' is illustrated. In stuffing sausage a solid follower is used.

An operating handle 21 is fixed to the upper end of the rod through the medium of which the rod is fed through the nut.

A supporting bracket is provided for supporting the receptacle, which supporting bracket includes an arm 22 which cooperates with a foot 22' carried at one end of the screw 21', the bracket also including upstanding arms 23 extending from the clamp and provided with notches 24 in their upper ends for receiving lugs 25 carried by the hopper. It will be manifest that the hopper may be readily lifted from the arms when the device is to be disassembled.

A wrench 26 as shown by Figure 6 of the drawings is provided, which wrench is formed with openings at its ends to be positioned adjacent to the plate 6 in a manner to accommodate the pins 28 so that when the wrench is positioned and slightly rotated, the members 7 may be disengaged from the pins 7' that extend from the body portion of the device. Thus it will be seen that the perforated plates 7 may be readily and easily disconnected for the application of the member 8.

This embodiment of the invention is illustrative only and it will be understood that the same may be modified in many respects and that such limits of modification are only governed by what is claimed.

What is claimed is:

In a press, a body portion, a yoke removably supported above the body portion, said yoke having an opening, a screw carrying a plunger adapted to operate through the opening in the yoke, a sectional nut in the opening and adapted to embrace a portion of the screw, said nut sections including bars, means for pivotally connecting the bars to the yoke, a locking plate section having an eccentrically formed opening, said nut having extensions, the opening of said plate adapted to accommodate the extensions, said sections adapted to be moved by the engagement of the extensions with the walls of the opening of the locking plate to cause the sections to grip the screw, and handles forming a part of the plate.

In testimony that I claim the foregoing as my own, I have hereto affixed my signature in the presence of two witnesses.

GEORGE W. PELTON.

Witnesses:
A. W. SCHOEMAKER,
M. W. STIRLEN.